United States Patent [19]

Roschger

[11] Patent Number: 5,626,633
[45] Date of Patent: May 6, 1997

[54] BULK DYEING OF PLASTICS

[75] Inventor: Peter Roschger, Köln, Germany

[73] Assignee: Bayer Aktiengesellschaft, Leverkusen, Germany

[21] Appl. No.: 566,317

[22] Filed: Dec. 1, 1995

Related U.S. Application Data

[63] Continuation of Ser. No. 263,222, Jun. 21, 1994, abandoned.

[30] Foreign Application Priority Data

Jun. 28, 1993 [DE] Germany ............... 43 21 420.7
Nov. 29, 1993 [DE] Germany ............... 43 40 560.6

[51] Int. Cl.$^6$ ............... D06P 3/00; D06P 3/24; D06P 3/52
[52] U.S. Cl. ............. 8/506; 8/512; 8/516; 8/565; 8/568; 8/569; 8/574; 8/576; 8/578; 8/579
[58] Field of Search ................. 8/506, 574, 576, 8/920, 512, 516, 565, 568, 569, 578, 579; 549/472, 475, 479; 548/453, 454, 465, 469, 512

[56] References Cited

U.S. PATENT DOCUMENTS

| | | | |
|---|---|---|---|
| 3,655,670 | 4/1972 | Spietschka et al. | 260/283 S |
| 3,661,899 | 5/1972 | Ford et al. | 260/240 |
| 3,788,853 | 1/1974 | Gilman, Jr. | 96/69 |
| 3,992,189 | 11/1976 | Goddard | 548/512 |
| 4,221,911 | 9/1980 | Schwander | 8/574 |
| 4,325,863 | 4/1982 | Hinsken et al. | 624/111 |
| 4,338,244 | 7/1982 | Hinsken et al. | 524/109 |
| 4,611,016 | 9/1986 | Hinsken et al. | 529/99 |
| 5,128,370 | 7/1992 | Grabley et al. | 549/479 |
| 5,163,972 | 11/1992 | Herter et al. | 8/655 |
| 5,274,072 | 12/1993 | Weaver et al. | 549/479 |
| 5,342,444 | 8/1994 | Harnisch et al. | 104/493 |

FOREIGN PATENT DOCUMENTS

| | | |
|---|---|---|
| 0103399 | 3/1966 | Denmark . |
| 527383 | 7/1992 | European Pat. Off. . |
| 942834 | 2/1949 | France . |
| 63-39859 | 2/1988 | Japan . |
| 559664 | 8/1965 | Switzerland . |
| 595571 | 12/1947 | United Kingdom . |
| 899917 | 6/1962 | United Kingdom . |
| 1041692 | 4/1964 | United Kingdom . |
| 966865 | 8/1964 | United Kingdom . |
| 1386846 | 3/1975 | United Kingdom . |
| 8001566 | 5/1980 | WIPO . |

OTHER PUBLICATIONS

Department of Chemistry, University of Cincinnati, Oct. 1964, p. 205; "Substituted γ–Lactones"; Walter et al.
Papers; Sep. 1990; pp. 789–794; "A New Facile Synthesis of Benzo[c]acridines"; Shanmugam.
J. Chem. Soc. Perkin Trans.; 1992; pp. 2981–2984; "Reactions of 3–Triphenyl–Phosphoranylidene–[b]fused Furan–2(3H)–ones with Some Salicyaldehydes".

Primary Examiner—Paul Lieberman
Assistant Examiner—Caroline L. Dusheck
Attorney, Agent, or Firm—Sprung Horn Kramer & Woods

[57] ABSTRACT

Dyestuffs of the formula (I)

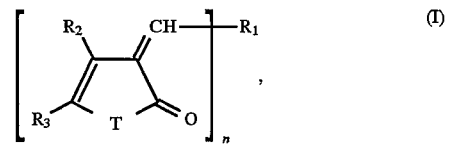

wherein n denotes 1 or 2,

T denotes O or N—$R_0$, wherein $R_0$ denotes H, alkyl, aryl or acyl or, together with $R_2$ or $R_3$, forms a 5- to 7-membered ring, $R_1$ if n=1, denotes aryl, hetaryl or heterocyclylidenemethyl and
if n=2, denotes a direct bond or arylene and $R_2$ and $R_3$ are independent or cyclic radicals having the meanings given in the description,
are employed for bulk dyeing of plastics, preferably thermoplastics.

7 Claims, No Drawings

BULK DYEING OF PLASTICS

This application is a continuation of application Ser. No. 08/263,222, filed Jun. 21, 1994, now abandoned.

The present invention relates to a process for the bulk dyeing of plastics. Bulk dyeing of plastics, for example thermoplastics, is known from, for example, GB-A-1 386 846 and U.S. Pat. No. 3,655,670.

The disadvantage of the known processes is that the dyestuffs used give only weak-coloured yellow (compare GB-A-1 386 846 and U.S. Pat. No. 3,655,670) colour shades.

The present invention relates to a process for bulk dyeing of plastics with dyestuffs of the formula (I)

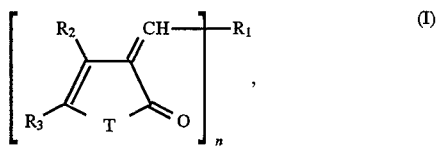

wherein n denotes 1 or 2, preferably 1,

T represents O or N—$R_0$, wherein $R_0$ denotes H, alkyl, aryl or acyl or, together with $R_3$ or $R_2$, forms a 5- to 7-membered ring, $R_1$ if n=1, denotes aryl, hetaryl or heterocyclylidenemethyl and if n=2, denotes a direct bond or arylene, and $R_2$ and $R_3$ independently of one another represent H, alkyl, aryl, aryl- or alkylsulphonyl, cyano or a radical of the formula —COR, wherein R represents alkoxy, amino, alkylamino, dialkylamino, arylamino, alkyl or aryl, or together form the radical of an optionally substituted aromatic, heteroaromatic or heteroaliphatic ring.

"Alkyl" here and below, unless defined in more detail, represents optionally substituted open-chain alkyl, open-chain alkenyl or optionally substituted cycloalkyl.

In a preferred embodiment of the process, dyestuffs of the formula (II)

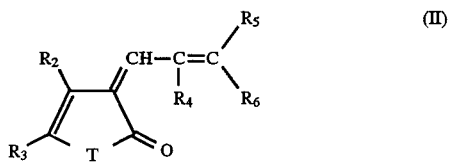

wherein

T denotes O or N—$R_0$, wherein $R_0$ has the abovementioned meaning, $R_4$ and $R_6$ together form the radical of an optionally substituted aromatic, in particular phenyl or naphthyl, or heteroaromatic, in particular of an optionally mono- or di-benzo-fused thiophene, furan, pyrrole, thiazole, oxazole, imidazole, pyridine, pyran or pyrimidine radical and $R_5$ represents H, alkyl, halogen, OH, alkoxy, acyloxy, aryloxy, alkylthio, arylthio, dialkylamino or acylamino, the possible substituents on the ring formed by $R_4$ and $R_6$ preferably having the meaning of $R_5$, or $R_5$ and $R_6$ together form the radical of an optionally substituted heterocyclic ring and $R_4$ represents H or alkyl, and $R_2$ and $R_3$ have the abovementioned meaning, are employed.

In a particularly preferred embodiment of the process, dyestuffs of the formula (III)

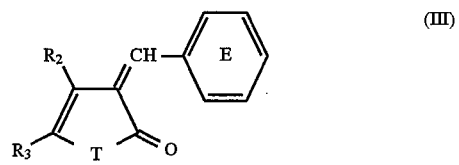

wherein

T, $R_2$ and $R_3$ have the abovementioned meaning, and the ring E is optionally substituted by alkyl, halogen, OH, alkoxy, aryloxy, acyloxy, dialkylamino, acylamino, alkylthio or arylthio, are employed.

Preferred dyestuffs of the formula (III) are those wherein the ring E carries one to three $C_1$–$C_4$-alkoxy radicals which are independent of one another and are optionally substituted by Cl, CN, OH, alkoxycarbonyl, alkoxy or acyloxy, or two of the alkoxy radicals are bonded to one another by a methylene bridge, or carries an aryloxy radical, in particular a phenyloxy or naphthyloxy radical, which is optionally substituted by alkyl, Cl, Br, alkoxy or alkoxycarbonyl, or carries a $C_1$–$C_4$-dialkylamino radical, which is optionally substituted by Cl, phenyl, CN, OH, alkoxy, dialkylamino, alkoxycarbonyl or acyloxy or is optionally linked to one or both ortho-positions of the E ring to form a heterocyclic ring, or carries a heterocyclic amino radical, or carries a $C_1$–$C_4$-alkylthio radical, which is optionally substituted by phenyl, OH, acyloxy or alkoxycarbonyl, or carries a phenyl- or naphthylthio radical, which is optionally substituted by Cl, alkyl or alkoxycarbonyl, and is optionally further substituted by up to two $C_1$–$C_4$-alkyl groups or halogen atoms, in particular Cl or Br, which are independent of one another, and/or an acylamino, acyloxy or hydroxyl group.

In a particularly preferred embodiment, the para-position of the ring E is substituted by one of the abovementioned alkoxy, aryloxy, alkylthio, arylthio or dialkylamino radicals.

Particularly suitable rings E are, for example:

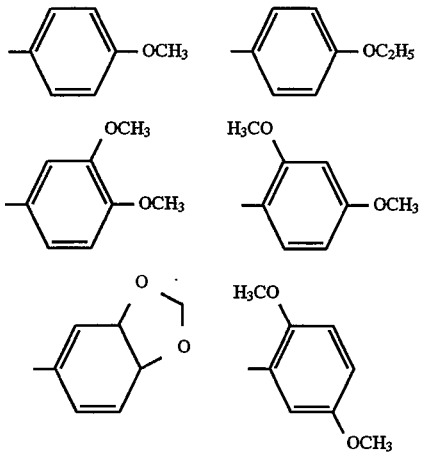

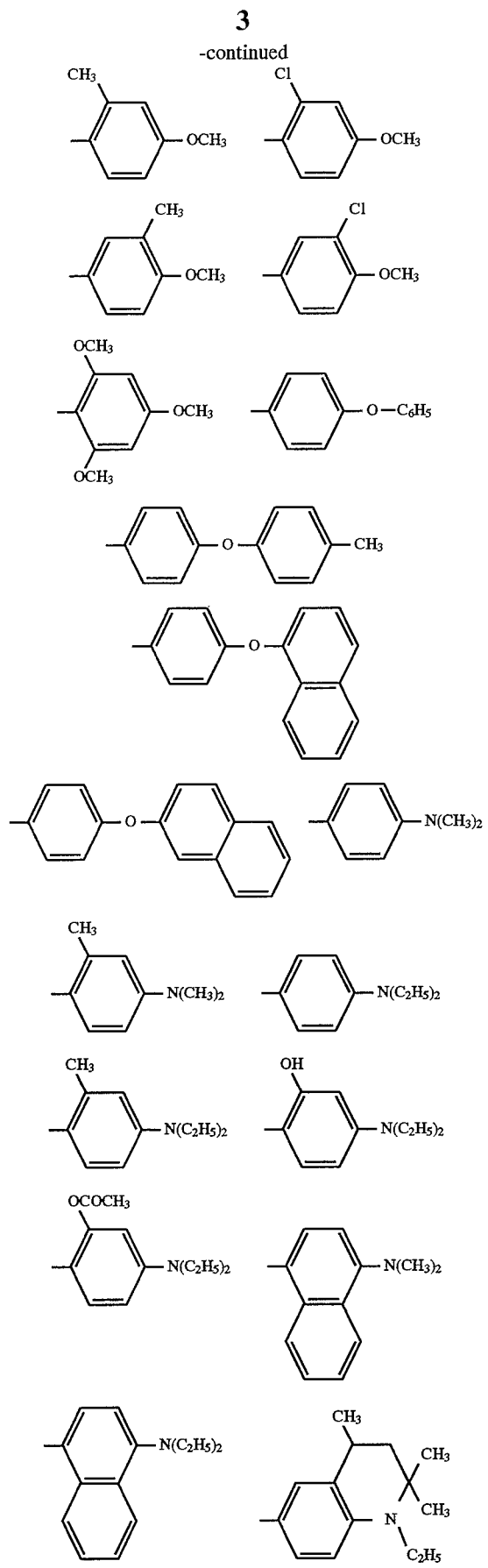
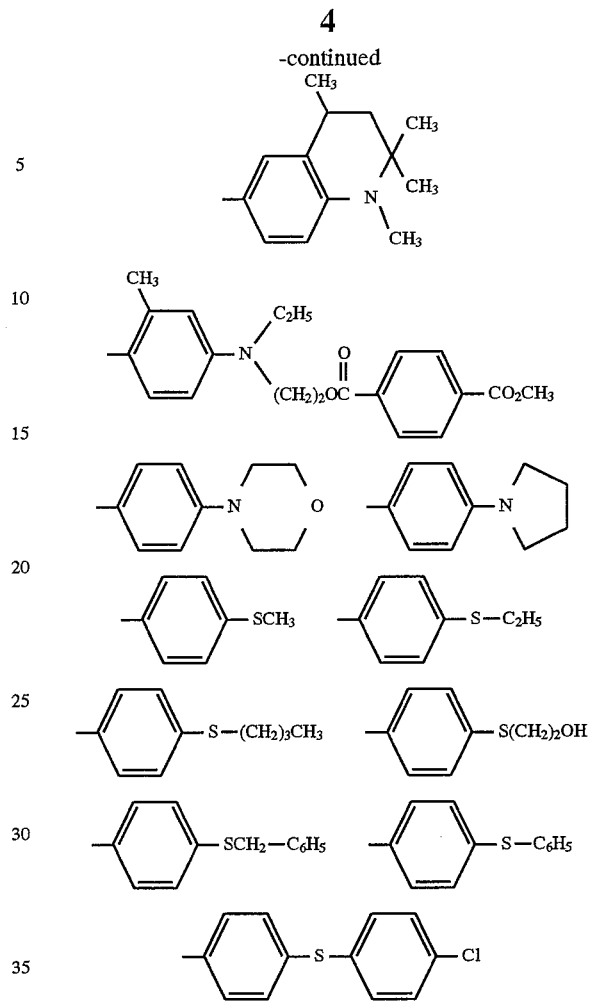

In another particularly preferred embodiment, dyestuffs of the formula (II) wherein $R_5$ and $R_6$ together form the radical of an optionally mono- or di-benzo-fused and/or further substituted pyrrole, thiazole, oxazole, imidazole, pyridine, pyran or pyrimidine, and $R_2$, $R_3$ and $R_4$ have the above meaning, are employed.

Dyestuffs which are especially preferably employed here are those of the formula (IV)

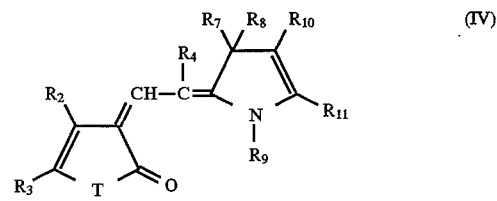

wherein

T, $R_2$ and $R_3$ have the above meanings, $R_4$ has the above meaning, and preferably represents H, $R_7$ and $R_8$ independently of one another represent $C_1$–$C_4$-alkyl, preferably $CH_3$, $C_2H_5$ or $C_3H_7$, or together form the radical of an optionally substituted carbocyclic 5- or 6-membered ring, preferably a tetra- or pentamethylene group, $R_9$ denotes a $C_1$–$C_4$-alkyl group which is optionally substituted by phenyl, Cl, OH, CN, alkoxycarbonyl, alkoxy, dialkylamino or acyloxy and $R_{10}$ and $R_{11}$ together form the radical of an optionally substituted benzene or naphthalene ring, preferred substituents which may be mentioned being Cl, $C_1$–$C_4$-alkyl, $C_1$–$C_4$-alkoxycarbonyl and $C_1$–$C_4$-alkoxy.

Suitable radicals of the formula

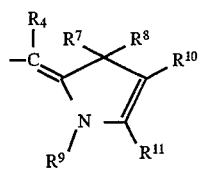

are, for example:

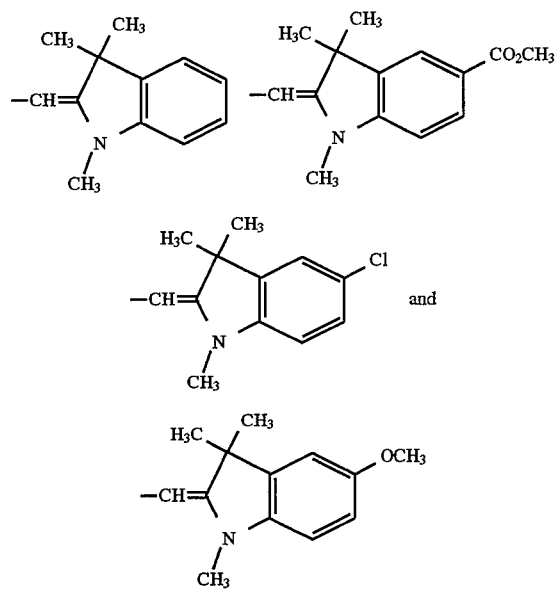

In another embodiment of the process, dyestuffs of the formula (I) wherein n denotes 2 and $R_1$ represents a direct bond or an arylene radical, preferably phenylene, in particular 1,4-phenylene, and T, $R_0$, $R_2$ and $R_3$ have the above meaning, are used.

In another embodiment of the process, the dyestuffs described above, in particular those of the formula (III) and (IV), wherein $R_2$ represents hydrogen and $R_3$ represents $C_1$–$C_4$-alkyl, in particular $CH_3$, or phenyl or naphthyl which is optionally substituted by $C_1$–$C_4$-alkoxy, preferably $OCH_3$, Cl, Br or $C_1$–$C_4$-alkyl, in particular methyl, for example $C_6H_5$ or

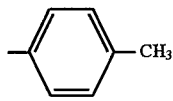

$R_2$ and $R_3$ together form a radical of the formula

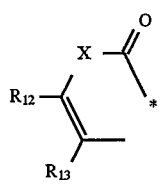

(F 1)

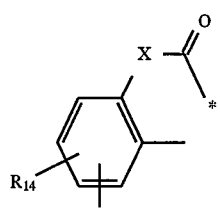

(F 2)

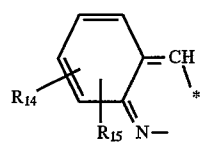

(F 3)

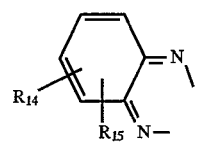

(F 4)

wherein the bond labelled with * identifies the $R_2$ linkage, and wherein

X represents O or N—$R_{16}$, wherein $R_{16}$ denotes H, $C_1$–$C_6$-alkyl or phenyl, $R_{12}$ represents H, phenyl or $C_1$–$C_4$-alkyl, $R_{13}$ represents H, phenyl, $C_1$–$C_4$-alkyl, $C_1$–$C_4$-alkoxycarbonyl, aminocarbonyl, mono- or di-alkylaminocarbonyl, arylaminocarbonyl, $C_1$–$C_4$-alkylcarbonyl, benzyl or Cl, $R_{14}$ and $R_{15}$ independently of one another represent H, Cl, $C_1$–$C_4$-alkyl, $C_1$–$C_4$-alkoxy or $C_1$–$C_4$-alkoxycarbonyl, or together form the radical of a benzo ring optionally substituted by these substituents, or $R_2$ and $R_3$ form the radical of an optionally substituted benzo or naphtho ring, the naphtho ring preferably being unsubstituted and 1,2-, 2,1- or 2,3-linked and the benzo ring preferably being substituted by 0 to 2 $C_1$–$C_6$-alkyl groups or chlorine atoms which are independent of one another or 0 to 1 $C_1$–$C_4$-alkoxy or $C_1$–$C_4$-alkoxycarbonyl radicals, are preferably used.

Suitable radicals which are formed together by $R_2$ and $R_3$ are, for example:

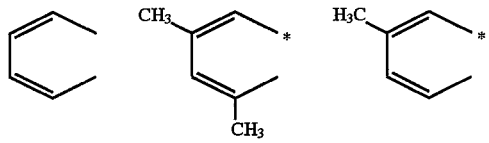

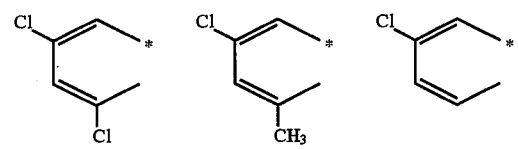

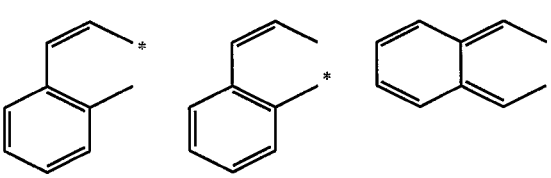

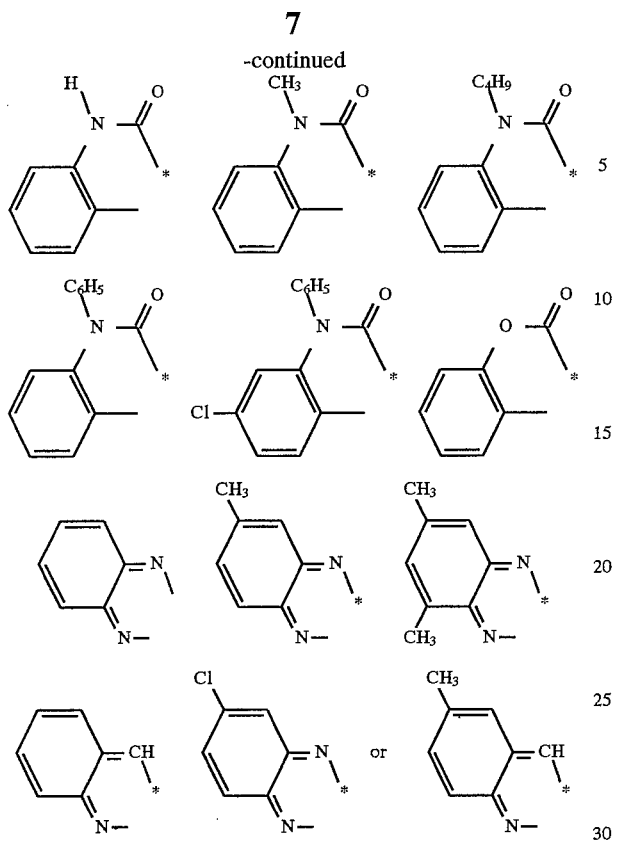

wherein the bond labelled with * identifies the $R_2$ linkage.

In another particular embodiment, $R_0$ represents H, $C_1$–$C_6$-alkyl or phenyl, in particular H or $C_1$–$C_4$-alkyl, such as, for example, methyl, ethyl, n-propyl, iso-propyl or n-, sec- or tert-butyl.

The invention furthermore relates to new dyestuffs of the formula (I) wherein n=1 or 2,

T=O, $R_1$ if n=1, denotes aryl, hetaryl or heterocyclylidenemethyl and
if n=2, denotes a direct bond or arylene and $R_2$ and $R_3$ together form the radical of an optionally substituted aromatic, heteroaromatic or heteroaliphatic ring, excluding dyestuffs of the formula

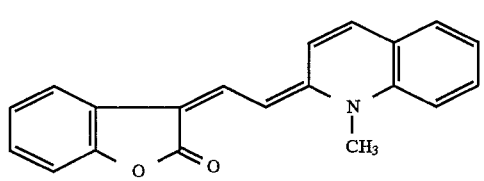

know from GB-A 966,865

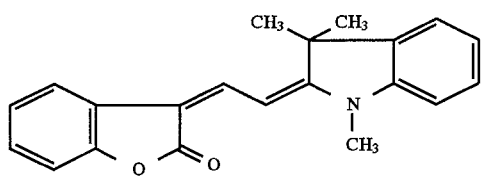

known from GB-A 899,917

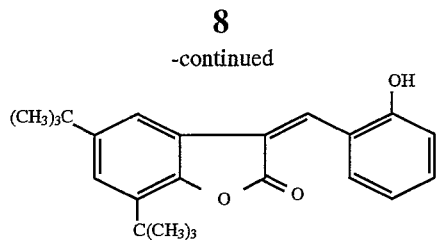

known from J. Chem. Soc. Perkin Trans. I (1992), 2981–2984

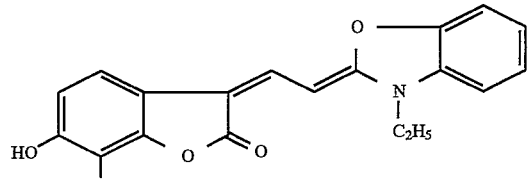

known from DE-A-1 912 102

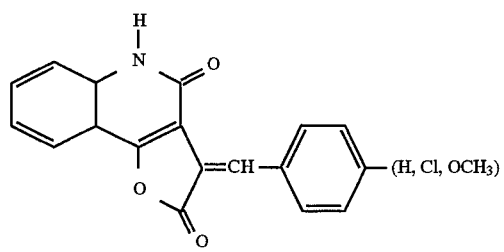

known from Synthesis 1990 pages 789–794

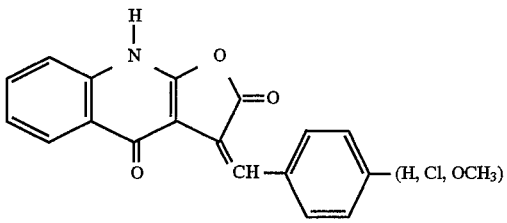

known from Synthesis 1990 pages 789–794

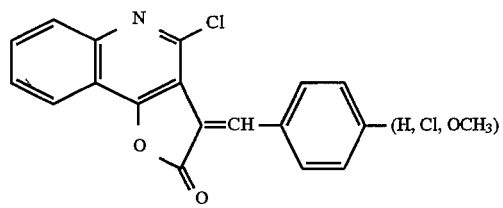

known from Synthesis 1990 pages 789–794 and dyestuffs of the formula

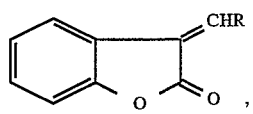

wherein

R denotes 2-furyl, 2-pyridyl, 3-pyridyl, 4-pyridyl, 3,4-dichlorophenyl, 2,4-dinitrophenyl, 2-bromophenyl, 4-bromophenyl, 2-chlorophenyl, 3-chlorophenyl, 4-chlorophenyl, 2-fluorophenyl, 2-nitrophenyl, 3-nitrophenyl, 4-nitrophenyl, 4-methylphenyl, 3,4-methylenedioxyphenyl, 2-methoxyphenyl, 3-methoxyphenyl, 4-methoxyphenyl, 2-ethoxyphenyl, 3,4-dimethoxyphenyl, 4-dimethylaminophenyl, 1-naphthyl, 2-naphthyl and 3,4-diethoxyphenyl, known from J. Heterocycl. Chem. 1, (1964) pages 205–206.

New dyestuffs of the formula (I) which correspond to the preferred embodiments of the above process for T=O are preferred.

The invention furthermore relates to a process for the preparation of the new dyestuffs of the formula (I) according to the invention, characterized in that a) compounds of the formula

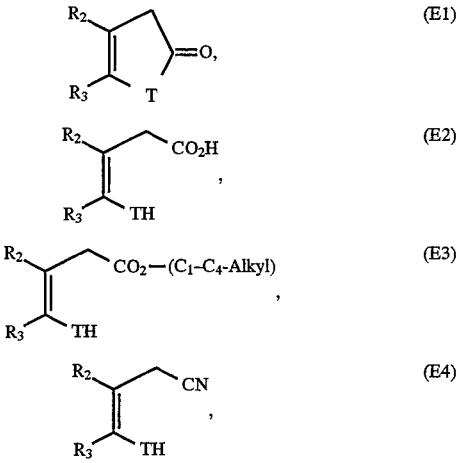

wherein $R_2$ and $R_3$ together have the meaning given for the new dyestuffs of the formula (I) where T=O, are reacted with compounds of the formula

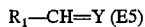

R$_1$—CH=Y (E5)

in which $R_1$ if n=1 or 2, has the above meanings and

Y represents O, $(C_6-C_{10}$-aryl)N, in particular phenyl-N, $(C_1-C_4$-alkyl)$_2$N*, in particular $(CH_3)_2$N*, $(C_6-C_{10}$-aryl) $(C_1-C_5$-acyl)N*, in particular (phenyl) $(CH_3CO)$ N*, or $(C_6-C_{10}$-aryl) $(C_1-C_5$-alkyl)N*, in particular (phenyl)(CH$_3$)N*, in a solvent or in the melt, optionally in the presence of a catalyst, at a temperature of 0° to 250° C., YH$_2$ (and optionally H$_2$O, alkyl—OH or NH$_3$) being split off, it being possible for the YH$_2$ preferably to be removed by addition of binding agents (for example acetic anhydride) or by means of physical methods (for example distillation), or b) compounds of the formula

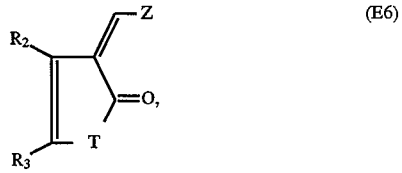

in which $R_2$ and $R_3$ together have the meaning given for the new dyestuffs of the formula (I) where T=O, Z represents OH, O($C_1-C_4$-alkyl), in particular —OCH$_3$, O($C_1-C_5$-acyl), in particular O—CO—CH$_3$, Cl , Br, $(C_1-C_4$-alkyl)$_2$N, in particular $(CH_3)_2$N, $(C_6-C_{10}$-aryl) NH, in particular phenyl—NH, $(C_6-C_{10}$-aryl) $(C_1-C_4$-alkyl ) N, in particular (phenyl) $(CH_3)$N, $(C_6-C_{10}$-aryl) $(C_1-C_5$-acyl ) N, in particular (phenyl) $(COCH_3)$N, NH$_2$ or $(C_1-C_4$-alkyl)NH, in particular CH$_3$NH, and R$_2$ and R$_3$ have the meaning given under a), are reacted with compounds of the formula $R_1$—H  (E7)

optionally in a solvent or a melt, at a temperature of 0° to 250° C., ZH being split off. It is also advantageous here to add a catalyst and to bind ZH.

The procedure according to preparation variant a) using compound (E1) or (E2) is preferably followed.

Solvents which are generally suitable for the two processes mentioned are alcohols, such as, for example, ethanol, methanol, propanols, butanols and the like, carboxylic acids, such as, for example, formic acid, acetic acid, propionic acid and the like, esters, for example ethyl acetate, polar aprotic solvents, for example dimethylformamide, N-methylpyrrolidone, dimethylacetamide, dimethylsulphoxide and the like, aromatics, for example benzene, toluene, xylenes, chloro-, dichloro- and trichlorobenzene and the like, ethers, for example tetrahydrofuran, dioxane, methyl t-butyl ether and the like, glycols and ethers thereof, for example mono-, di-, tri- and tetraethylene glycol, propylene glycol, methyl, ethyl and butyl ethers thereof and the like, and halogenoaliphatics, for example dichloromethane, dichloroethane, chloroform and the like.

Acid and basic catalysts are possible.

Acid catalysts which may be mentioned are: carboxylic acids, for example acetic acid, propionic acid, chloroacetic acid, benzoic acid and the like, sulphonic acids, for example toluenesulphonic acid, methanesulphonic acid and the like, inorganic acids, such as, for example, sulphuric, hydrochloric, phosphoric and hydrobromic acid and the like, zinc chloride, aluminium chloride, boron trifluoride and the like.

Suitable basic catalysts are, for example: organic bases, for example amines, such as triethylamine, dialkylamine, piperidine, pyrrolidine, morpholine, N,N-dimethylaniline and the like, alcoholates, for example sodium methylate, potassium t-butylate and the like, carboxylic acid salts, for example sodium acetate or potassium acetate and the like, alkali metal or alkaline earth metal oxides, hydroxides or carbonates, for example sodium hydroxide, potassium hydroxide, calcium oxide, magnesium oxide, sodium carbonate, potassium carbonate, sodium bicarbonate and the like, ammonia, tetrabutylammonium hydroxide and the like.

A suitable reaction temperature for the preparation processes described under a) and b) is the range from 0° to 250° C. preferably between 15° and 220° C.

The already known dyestuffs of the formula (I) can be prepared by a process analogous to the process according to the invention, wherein T denotes O or N—R$_0$ and R$_0$ has the above meaning.

For dyestuffs of the formula (I) where T=N—R$_0$, the procedure according to preparation variant (a) using the compound (E1) where T=N—R$_0$ is preferably followed. Compounds of the formula (I) where T=N—R$_0$ are known in some cases from J. Chem. Soc. Perkin Trans. II 4 (1984), 615–619; Khim. Geterosikl. Soedin, 1972, 1237.

The starting substances listed wherein T=O are commercially obtainable or readily accessible, for example in accordance with WO 9208703; J. Org. Chem. 16 (1951), pages 1588, 1590, inter alia.

The starting substances wherein T=N—R$_0$ and R$_0$ has the abovementioned meaning are commercially obtainable or readily accessible, for example in accordance with J. Med. Chem. 32 (1989), pages 437–444; EP-A-252 713 or U.S. Pat. No. 4,690,943.

Bulk dyeing here is understood as meaning, in particular, processes in which the dyestuff is incorporated into the molten plastics composition, for example with the aid of an extruder, or in which the dyestuff is already added to starting components for the preparation of the plastic, for example monomers, before the polymerization.

Particularly preferred plastics are thermoplastics, for example vinyl polymers, polyesters and polyamides.

Suitable vinyl polymers are polystyrene, styrene/acrylonitrile copolymers, styrene/butadiene copolymers, styrene/butadiene/acrylonitrile terpolymers and polymethacrylate, inter alia.

Suitable polyesters furthermore are: polyethylene terephthalates, polycarbonates and cellulose esters.

Polystyrene, styrene copolymers, polycarbonates and polymethacrylate are preferred. Polystyrene is particularly preferred.

The high molecular weight compounds mentioned can be present individually or as mixtures, as plastic compositions or as melts.

The dyestuffs according to the invention are used in finely divided form, it being possible but not essential to co-use dispersing agents.

If the dyestuffs (I) are employed after the polymerization, they are mixed or ground with the granules of plastic in the dry state, and this mixture is plasticized and homogenized, for example on mixing rolls or in extruders. However, the dyestuffs can also be added to the molten composition and this can be distributed homogeneously by stirring. The material predyed in this way is then further processed in the customary manner, for example by spinning to bristles, filaments and the like, or by extrusion or in the injection moulding process to give mouldings.

Since the dyestuffs of the formula (I) are stable with respect to polymerization catalysts, in particular peroxides, it is also possible to add the dyestuffs to the monomeric starting materials for the plastics and then to polymerize the starting materials in the presence of polymerization catalysts. For this, the dyestuffs are preferably dissolved in the monomeric components or intimately mixed with them.

The dyestuffs of the formula (I) are preferably employed for dyeing the polymers mentioned in amounts of 0.0001 to 1% by weight, in particular 0.01 to 0.5% by weight, based on the amount of polymer.

Corresponding valuable opaque dyeings can be obtained by addition of pigments which are insoluble in the polymers, such as, for example, titanium dioxide.

Titanium dioxide can be used in an amount of 0.01 to 10% by weight, preferably 0.1 to 5% by weight, based on the amount of polymer.

Transparent or opaque brilliant, greenish-tinged yellow to violet dyeings of good heat resistance and good fastness to light and weathering are obtained by the process according to the invention.

Mixtures of various dyestuffs of the formula (I) and/or mixtures of dyestuffs of the formula (I) with other dyestuffs and/or inorganic or organic pigments can also be employed in the process according to the invention.

The following examples serve to illustrate the present invention, but without limiting it.

"Parts" are to be understood as parts by weight, unless stated otherwise.

The abbreviations used in the examples have the following meanings:

Me=methyl
Et=ethyl
Ph=phenyl
Ac=acetyl

EXAMPLE 1

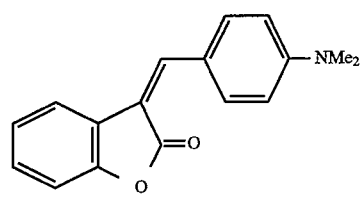

A) Preparation

A mixture of 2.0 g of benzofuranone of the formula

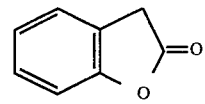

2.3 g of 4-dimethylaminobenzaldehyde, 0.2 ml of piperidine and 40 ml of toluene are heated under reflux using a water separator for 1 hour. After cooling, the precipitate formed is filtered off with suction, washed with a little toluene and methanol and then dried. Yield: 2.9 g B) Dyeing examples Example a)

100 parts of polystyrene granules and 0.02 part of a dyestuff of the above formula are mixed intensively in a drum mixer for 15 minutes. The granules, coloured in the dry state, are processed on a screw injection moulding machine at 240° C. Transparent, yellow sheets of very good fastness to light are obtained. Instead of polystyrene polymer, copolymers with butadiene and acrylonitrile can also be used. If 0.5 part of titanium dioxide is additionally added, deep opaque dyeings are obtained.

Example b)

0.015 part of the dyestuff from Example A) and 100 parts of polymethylmethacrylate are mixed in the dry state and homogenized on a 1-shaft extruder at 230° C. The material emerging from the extruder as the extrudate is granulated. It can then be pressed to shapes. A plastic dyed transparently yellow with good fastness to light and weathering is obtained.

Example c)

100 parts of a commercially available polycarbonate are mixed in the dry state in the form of granules with 0.03 part of the dyestuff from Example A). The granules dusted in this way are homogenized on a 2-shaft extruder at 290° C. A transparent yellow dyeing of good fastness to light is obtained. The dyed polycarbonate is discharged from the extruder as an extrudate and processed to granules. The granules can be processed by the customary methods for making up thermoplastic compositions.

If the procedure is as described above but with addition of 1% of titanium dioxide, a yellow opaque dyeing is obtained.

Example d)

0.04 part of the dyestuff from Example A) is mixed in the dry state with 100 parts of styrene/acrylonitrile copolymer and the mixture is homogenized in a 2-shaft extruder at 190° C., granulated and then pressed to shapes in the customary manner. A transparently yellow plastic of good fastness to light is obtained.

Example e)

0.025 part of the dyestuff from Example A) is mixed with 100 parts of polyethylene terephthalate of a transparent type and the mixture is homogenized in a 2-shaft extruder at 280° C. A transparent, yellow dyeing of good fastness to light is obtained. After subsequent granulation, the coloured plastic can be processed by the customary methods of thermoplastic shaping. If the procedure is followed with addition of 1% of titanium dioxide, an opaque dyeing is obtained.

Example f)

0.05 part of tert-dodecylmercaptan and 0.05 part of the dyestuff from Example A) are dissolved in 98.9 parts of styrene. This solution is dispersed in a solution of 200 parts of desalinated water, 0.3 part of partly hydrolysed polyvinyl acetate (for example Mowiol® 50/88 from Hoechst) and 0.05 part of dodecyl benzenesulphonate. After addition of 0.1 part of dibenzoyl peroxide in 1 part of styrene, the dispersion is heated to 80° C., while stirring vigorously, and the polymerization is started. By applying the following polymerization conditions: 4 hours at 80° C., 2 hours at 90° C., 3 hours at 110° C., 2 hours at 130° C., the polymer is obtained in a yield of 98% of theory. The polymer is obtained in the form of beads which have a diameter of 0.1 to 1.5 mm ($D_{50}$ value), depending on the stirring conditions. The polymer is separated from the serum by filtration and dried to a residual moisture content of 0.5% at 110° C. After melting in a mixing unit (heating roll), 0.5% of zinc stearate and 0.2% of Ionol are added and the polymer is granulated.

The polymer can be processed to yellow, transparent mouldings by the customary methods of thermoplastic shaping, for example in the injection moulding process.

Example g)

0.2 part of tert-dodecylmercaptan and 0.01 part of the dyestuff from Example A) are dissolved in 74.8 parts of styrene and 25 parts of acrylonitrile and the solution is then dispersed in a solution of 200 parts of completely desalinated water and 0.2 part of a copolymer, neutralized with sodium hydroxide, of styrene and maleic anhydride. After addition of 0.1 part of dibenzoyl peroxide, dissolved in one part of styrene, the dispersion is heated to 80° C., while stirring vigorously, and the polymerization is started. After polymerization as in Example f), the product is also worked up in the same manner as described in the example. 0.5% of zinc stearate, as a lubricant, and 0.5% of Ionol, as an anti-ageing agent, are incorporated on a heating roll. The granulated polymer can be injection moulded to transparent yellow mouldings.

Example h)

A solution of 99.95 parts of styrene, 0.04 part of the dyestuff from Example A) and 0.01 part of di-tert-butyl peroxide is introduced into a continuously operating preliminary reactor operated in overflow and is subjected to initial polymerization at a temperature of 75° C. The initially polymerized solution (polystyrene content 20%) emerging from the preliminary reactor is introduced into a 2-shaft screw unit. The two shafts run in opposite directions at 20 revolutions per minute. The four heatable and coolable segments of the screw machine are kept at 110° C., 130° C., 160° C., 180° C. in the product intake-product discharge sequence. The polymer leaves the screw reactor with a solids concentration of 80%. 3 parts by weight of Ionol and 5 parts by weight of octyl alcohol per 1000 parts by weight of polymer solution are metered in in a subsequent extruder, and the polymer is degassed and then granulated. The yellow granules can be processed to give mouldings.

Example i)

0.02 part of the dyestuff from Example A) is dissolved in 74.97 parts of styrene and 25 parts of acrylonitrile or methacrylonitrile. After addition of 0.01 part of di-tert-butyl peroxide, the solution thus obtained is introduced into a continuously operating preliminary reactor operated in overflow. The polymerization and working up are carried out as described in Example h). The transparent, yellow granules can be further processed to profiles and sheets by the customary methods of processing of thermoplastic compositions.

Example k)

0.03 part of the dyestuff from Example A) is dissolved in 99.97 parts of methyl methacrylate. After addition of 0.1 part of dibenzoyl peroxide, the solution is heated to 120° C. and the polymerization is started. After 30 minutes, the initially polymerized methyl methacrylate is polymerized completely between two glass sheets at 80° C. for 10 hours. Yellow, transparent polymethyl methacrylate sheets are obtained.

Example l)

100 parts of polyamide 6 chips obtained by polymerization of ε-caprolactam are intimately mixed with 0.05 part of the dyestuff from Example A) in a shaking machine. The powdered chips thus obtained are melted at 260° C. in an extruder, the resulting melt is forced through a single-hole die of diameter 0.5 mm and the emerging filament is drawn off at a speed of about 25 m/minute. The filament can be stretched 4-fold in hot water. A transparently yellow-coloured filament of excellent fastness to light is obtained. If an opaque dyeing is to be obtained, 0.5 part of titanium dioxide is additionally added.

The resident time in the extruder can be up to 30 minutes without impairment of the colour shade.

EXAMPLE 2

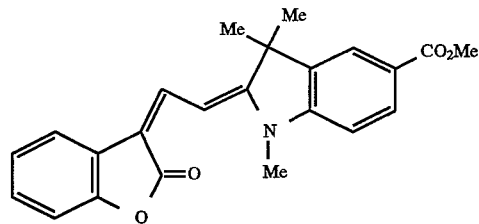

A mixture of 1.34 g of benzofuranone, 3.2 g of an aldehyde of the formula

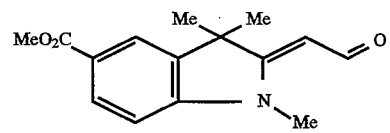

0.2 ml of piperidine and 40 ml of toluene is heated under reflux for 2.5 hours, using a water separator. After cooling, the product which has precipitated is filtered off with suction and recrystallized from boiling toluene. Yield: 2.2 g.

Deep yellow shades with good fastness properties are obtained analogously to the dyeing examples from Example 1.

EXAMPLE 3

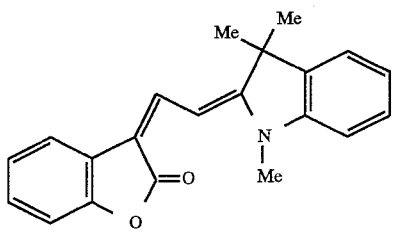

A mixture of 1.34 g of benzofuranone, 2.01 g of the compound of the formula

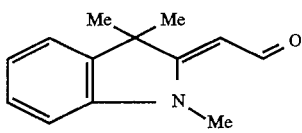

0.2 ml of piperidine and 40 ml of toluene is heated under reflux for 1.5 hours, using a water separator. The toluene is then removed in vacuo and the resinous product is covered with a layer of cyclohexane. After some hours, the solidified product is triturated with cyclohexane and the precipitate is then filtered off with suction. Yield: 2.6 g.

When used for dyeing analogously to the dyeing examples from Example 1, intensive yellow dyeings are obtained.

EXAMPLE 4

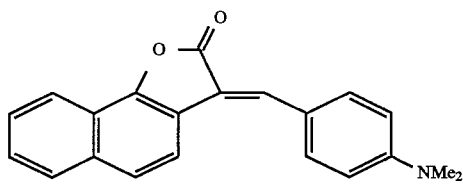

A mixture of 1.84 g of the naphthofuranone of the formula

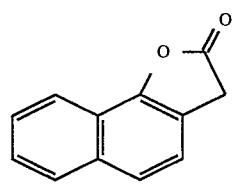

1.5 g of 4-dimethylaminobenzaldehyde, 0.2 ml of piperidine and 25 ml of toluene is heated under reflux for 2 hours, using a water separator. After cooling, the precipitate formed is filtered off with suction and washed with methanol. Yield: 2.6 g.

If the above dyestuff is used for dyeing analogously to the dyeing examples from Example 1, fast, deep yellow shades are obtained.

EXAMPLE 5

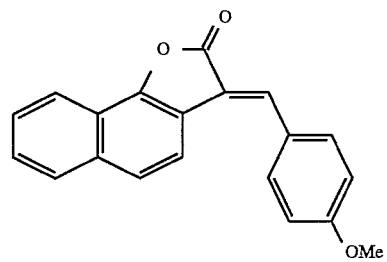

A mixture of 2.76 g of the naphthofuranone from Example 4, 2.04 g of 4-methoxybenzaldehyde, 0.2 ml of piperidine and 30 ml of toluene is heated under reflux for 2 hours, using a water separator. After some hours, the precipitate is filtered off with suction and washed with methanol. Yield: 3.3 g.

When used for dyeing analogously to the dyeing examples from Example 1, the above dyestuff gives deep greenish-tinged yellow dyeings.

EXAMPLE 6

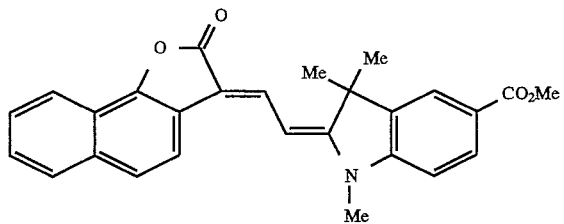

1.84 g of the naphthofuranone from Example 4, 3.2 g of the aldehyde from Example 2, 0.2 ml of piperidine and 40 ml of toluene are heated at the boiling point, using a water separator. After 4 hours, the reaction mixture is filtered and the product is precipitated from the filtrate in the cold with a large quantity of methanol. Yield 1.1 g.

If the above dyestuff is used for dyeing analogously to the examples from Example 1, deep orange shades are obtained.

EXAMPLE 7

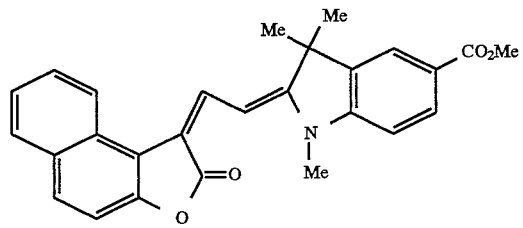

A mixture of 2.0 g of the furanone of the formula

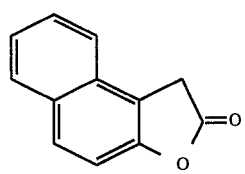

2.6 g of the aldehyde from Example 2, 0.2 ml of piperidine and 30 ml of xylene is heated for 2 hours, using a water separator. After cooling, the resulting precipitate is filtered off with suction and recrystallized from pyridine/methanol. Yield: 1.0 g.

In plastics, the dyestuff gives intensive, red dyeings analogously to the dyeing examples from Example 1.

EXAMPLE 8

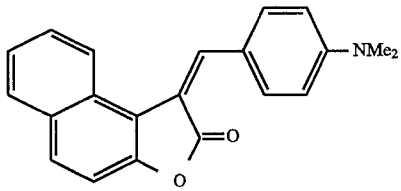

A mixture of 2.0 g of the furanone from Example 7, 1.5 g of 4-dimethylaminobenzaldehyde, 0.2 ml of piperidine and 30 ml of toluene is heated for 2 hours, using a water separator. The precipitate is then filtered off with suction and recrystallized from methanol. Yield: 0.9 g.

The above dyestuff dyes plastics in strong orange shades in accordance with the dyeing examples from Example 1.

EXAMPLE 9

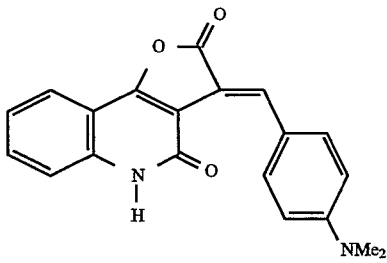

A mixture of 1.6 g of a quinolone of the formula

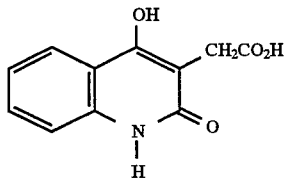

1.15 g of 4-dimethylaminobenzaldehyde, 10 ml of glacial acetic acid and 12.5 ml of acetic anhydride is heated under reflux for 1 hour. After cooling, the precipitate formed is filtered off with suction and washed with a little glacial acetic acid and methanol. Yield: 1.8 g.

The dyestuff gives deep orange dyeings when used for dyeing analogously to the dyeing examples from Example 1.

EXAMPLE 10

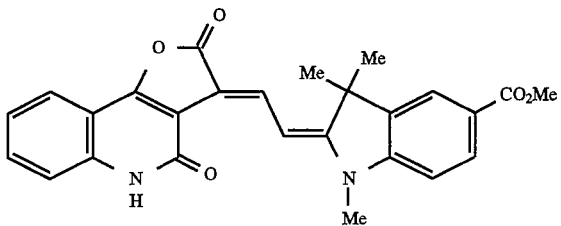

1.3 g of the quinolone from Example 9, 2.0 g of the aldehyde from Example 2, 10 ml of glacial acetic acid and 12.5 ml of acetic anhydride are heated under reflux for 30 minutes. The precipitate is then filtered off cold with suction and rinsed with methanol. Yield: 2.4 g.

The dyestuff shows intensive orange-red colour shades with good fastness properties when used for dyeing in accordance with the dyeing examples from Example 1.

EXAMPLE 11

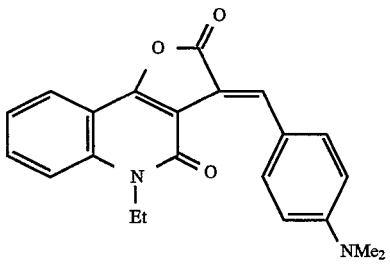

A mixture of 9.8 g of the quinolone of the formula

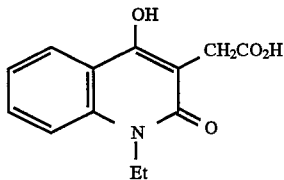

6.7 g of 4-dimethylaminobenzaldehyde, 20 ml of glacial acetic acid and 25 ml of acetic anhydride is heated at the boiling point for 30 minutes and the precipitate is then filtered off hot with suction. It is washed with a little glacial acetic acid and methanol. Yield: 13.3 g.

When used for dyeing analogously to the above dyeing examples, yellow dyeings with good fastness properties are obtained.

EXAMPLE 12

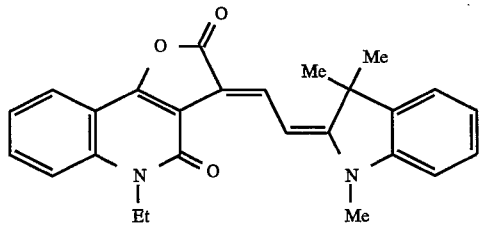

3.7 g of the quinolone from Example 11, 3.16 g of the aldehyde from Example 3, 20 ml of glacial acetic acid and 25 ml of acetic anhydride are heated under reflux for 30 minutes. The product which precipitates on cooling is filtered off with suction, washed with glacial acetic acid and acetone and dried at 70° C. in vacuo. Yield: 5.5 g.

When used for dyeing in accordance with the dyeing examples from Example 1, the above dyestuff gives deep orange shades.

EXAMPLE 13

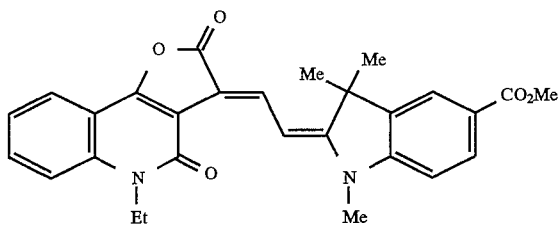

A mixture of 3.7 g of the quinolone from Example 11, 5.04 g of the aldehyde from Example 2, 20 ml of glacial acetic acid and 25 ml of acetic anhydride is heated at the boiling point for 30 minutes and then allowed to cool. The precipitate formed is filtered off with suction, washed with acetic acid, methanol and acetone and dried. Yield: 6.3 g.

When used for dyeing analogously to the above dyeing examples from Example 1, deep orange dyeings are obtained with the above dyestuff.

EXAMPLE 14

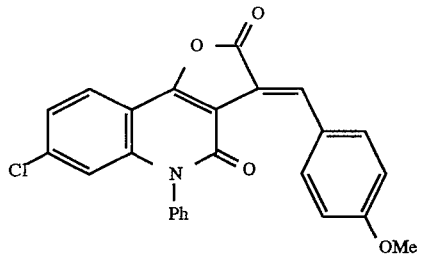

A mixture of 3.3 g of the quinolone of the formula

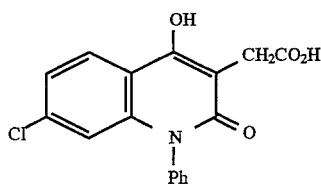

1.6 g of 4-methoxybenzaldehyde, 20 ml of glacial acetic acid and 25 ml of acetic anhydride is heated under reflux for 5 hours. The precipitate formed is filtered off with suction at about 80° C. and rinsed with methanol. Yield: 1.6 g.

Greenish-tinged yellow dyeings are obtained when the dyestuff is used for dyeing analogously to the above dyeing examples from Example 1.

EXAMPLE 15

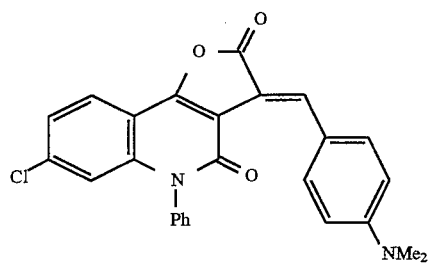

3.3 g of the quinolone from Example 14, 1.8 g of 4-dimethylaminobenzaldehyde, 40 ml of glacial acetic acid and 50 ml of acetic anhydride are heated under reflux for 45 minutes. The precipitate is then filtered off with suction at about 80° C. and washed with methanol. Yield: 4.3 g.

When used for dyeing analogously to Dyeing Examples 1B), the dyestuff gives orange-red colour shades.

EXAMPLE 16

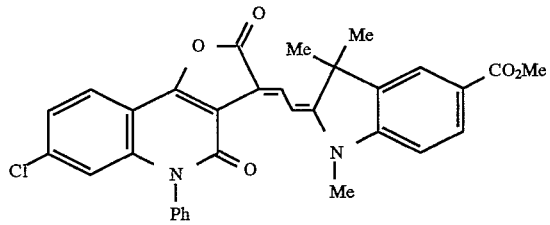

4.42 g of the quinolone from Example 14, 5.04 g of the aldehyde from Example 2, 20 ml of glacial acetic acid and 25 ml of acetic anhydride are heated at the boiling point for 30 minutes. Thereafter, the mixture is cooled to room temperature and the precipitate is filtered off with suction and rinsed with methanol and acetone. Yield: 7.1 g.

When used for dyeing in accordance with Dyeing Examples 1B), the above dyestuff gives intensive, bluish-tinged red dyeings.

EXAMPLE 17

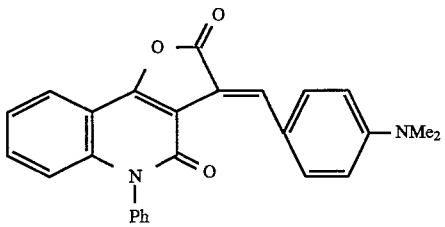

A mixture of 2.77 g of the compound of the formula

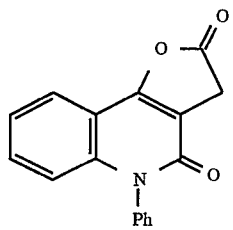

1.5 g of 4-dimethylaminobenzaldehyde, 12 ml of acetic anhydride and 10 ml of glacial acetic acid is heated at the boiling point for 15 minutes. The precipitate formed is filtered off hot with suction and washed with glacial acetic acid and methanol. Yield: 3.7 g.

When used for dyeing analogously to Dyeing Examples 1B), strong, reddish-tinged yellow dyeings are obtained.

EXAMPLE 18

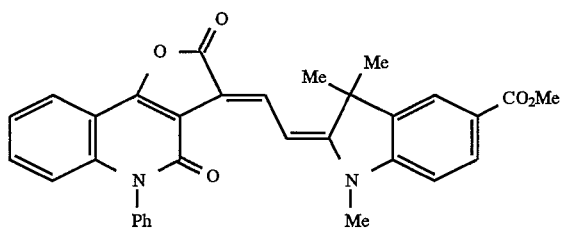

A solution of 2.77 g of the compound of the formula

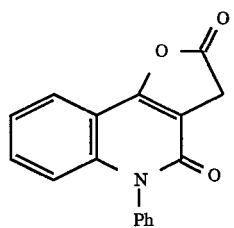

and 3.15 g of the aldehyde from Example 2 in 12.5 ml of acetic anhydride and 10 ml of acetic acid is heated under reflux for 1 hour. The mixture is then allowed to cool and the precipitate formed is filtered off with suction. The product is washed with glacial acetic acid and methanol and dried. Yield: 4.8 g When used for dyeing in accordance with Dyeing Examples 1B), the above dyestuff gives strong red shades in plastics.

EXAMPLE 19

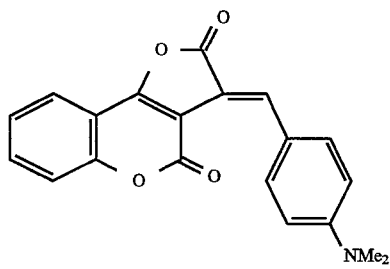

A mixture of 1.65 g of the coumarin of the formula

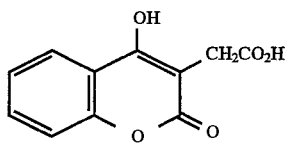

1.1 g of 4-dimethylaminobenzaldehyde, 8 ml of acetic anhydride and 7 ml of acetic acid is heated at the boiling point for 1.5 hours. The precipitate formed is filtered off with suction at 70° C., washed with glacial acetic acid and methanol and dried. Yield: 2.5 g.

The above dyestuff dyes plastics in accordance with Dyeing Examples 1B) in intensively orange shades.

EXAMPLE 20

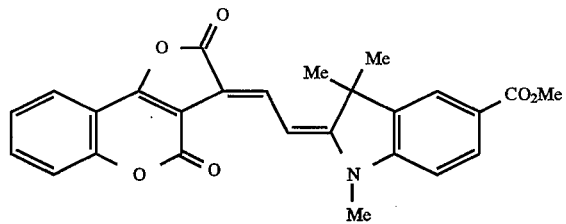

1.65 g of the coumarin of the formula

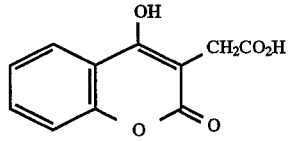

and 2.4 g of the aldehyde from Example 2 are heated at the boiling point in 12 ml of acetic anhydride and 10 ml of acetic acid for 45 minutes. After cooling, the product is filtered off with suction and washed with glacial acetic acid and methanol. Yield: 3.3 g.

When used for dyeing in plastics analogously to Dyeing Examples 1B), strong red shades of good fastness to light are obtained.

EXAMPLE 21

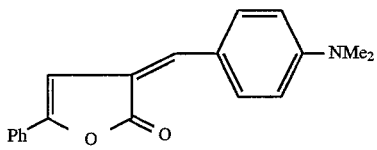

A mixture of 3.56 g of 3-benzoylpropionic acid, 2.98 g of 4-dimethylaminobenzaldehyde, 12.5 ml of acetic anhydride and 10 ml of glacial acetic acid is heated under reflux for 1 hour. After cooling, the precipitate formed is filtered off with suction and recrystallized from 20 ml of glacial acetic acid. Yield: 2.4 g.

The dyestuff gives deep yellow shades when used for dyeing in accordance with Dyeing Examples 1B).

EXAMPLE 22

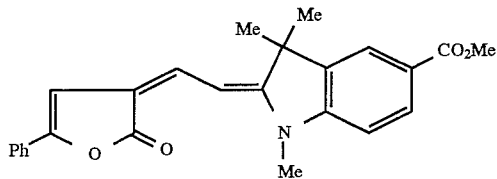

A mixture of 3.56 g of 3-benzoylpropionic acid, 6.4 g of the aldehyde from Example 2, 12.5 ml of acetic anhydride and 10.0 ml of glacial acetic acid is heated under reflux for 1 hour. After cooling, the product is filtered off with suction and purified by reprecipitation from dimethylformamide/water. Yield: 2.8 g.

The above dyestuff dyes components of plastic in intensive orange shades in accordance with Dyeing Examples 1B).

EXAMPLE 23

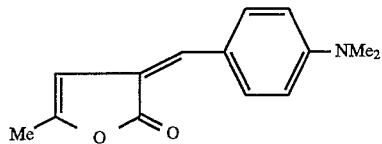

A mixture of 2.2 g of α-angelica-lactone (5-methyl-2-furanone), 3.0 g of 4-dimethylaminobenzaldehyde and 0.1 ml of piperidine is heated to 180° to 185° C. in the course of 3 hours and then kept at this temperature for 3 hours. During this period, the water of reaction is distilled off. Divided into 2 portions, a total of 4.4 g of α-angelica-lactone and 0.5 ml of piperidine is subsequently added at intervals. The reaction mixture is then dissolved in glacial acetic acid and the product is subjected to fractional precipitation with ice/water, a total of 1.35 g of pure product being obtained.

The dyestuff gives deep yellow shades when used for dyeing in accordance with Dyeing Examples 1B).

EXAMPLE 24

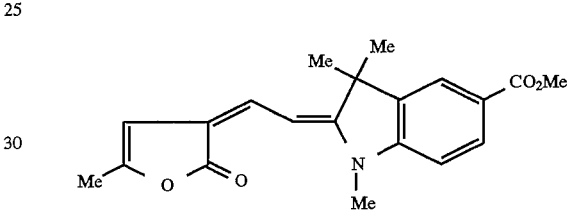

A mixture of 2.2 g of α-angelica-lactone, 6.3 g of the aldehyde from Example 2, 30 ml of toluene and 0.3 ml of piperidine is heated for 18 hours, using a water separator. The solvent is then removed in vacuo and the residue is subsequently recrystallized from 15 ml of glacial acetic acid. Yield: 1.2 g.

The above dyestuff dyes plastics in intensive yellow shades in accordance with Dyeing Examples 1B).

EXAMPLE 25

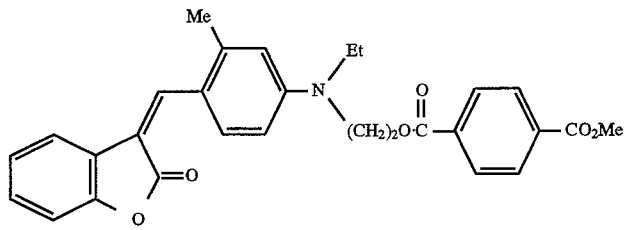

A mixture of 3.3 g of the benzofuranone from Example 1, 6.3 g of an aldehyde of the formula

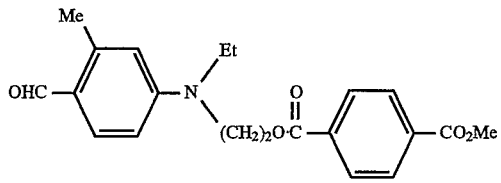

12.5 ml of acetic anhydride and 10 ml of glacial acetic acid is heated under reflux for 3 hours and then concentrated to dryness in vacuo. The residue is ground thoroughly several times with ligroin and the ligroin is repeatedly decanted off. The residue is then stirred with a few portions of diethyl ether and the ether phase is subsequently concentrated. The precipitate is filtered off with suction and dried. Yield: 1.7 g.

When used for dyeing in accordance with Dyeing Examples 1B), strong yellow shades are obtained with the above dyestuff.

EXAMPLE 26

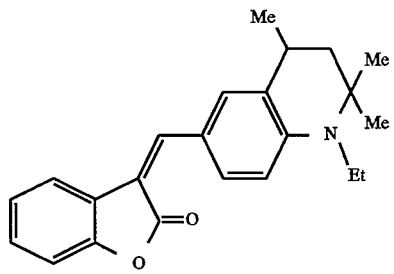

A solution of 2.7 g of the benzofuran from Example 1, 4.1 g of the aldehyde of the formula

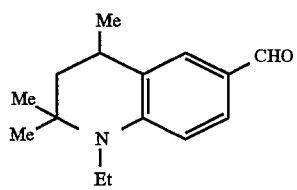

and 0.3 ml of piperidine in 30 ml of toluene is heated at the boiling point under reflux for 1 hour, using a water separator. Thereafter, the volatile constituents are removed in vacuo and the residue is triturated several times with fresh ligroin portions. The viscous residue is subsequently taken up in diethyl ether and the mixture is cooled to 0° C. The precipitate formed is filtered off cold with suction and dried. Yield: 1.6 g The above dyestuff gives intensive yellow shades when used for dyeing in plastics analogously to Dyeing Examples 1B).

EXAMPLE 27

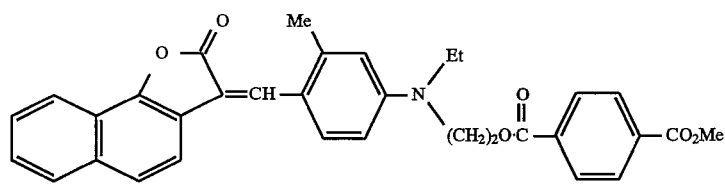

A mixture of 1.84 g of the naphthofuranone from Example 4, 3.7 g of the aldehyde from Example 25, 0.3 ml of piperidine and 30 ml of toluene is heated at the boiling point for 2 hours, using a water separator. 10 ml of toluene are then distilled off and the mixture is allowed to cool. The precipitate formed is filtered off with suction and washed with diethyl ether. Yield: 0.9 g. A further 2.0 g precipitate out of the combined toluene and ether filtrates when these are left to stand overnight.

When used for dyeing analogously to Dyeing Examples 1B), strong reddish-tinged yellow shades are obtained with the above dyestuff.

EXAMPLE 28

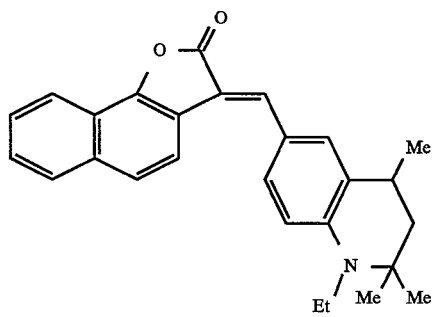

A solution of 1.84 g of the naphthofuranone from Example 4 and 2.3 g of the aldehyde from Example 26 in 12.5 ml of acetic anhydride and 10.0 ml of glacial acetic acid is heated under reflux for 30 minutes and then concentrated to dryness in vacuo. The residue is dissolved in 100 ml of glacial acetic acid. 50 ml of water are now added dropwise to this solution, while stirring vigorously, and the mixture is then subsequently stirred overnight. The precipitate is filtered off with suction, washed with water and dried. Recrystallization from 10 ml of toluene gives 1.9 g of the above product.

When used for dyeing in plastics in accordance with Dyeing Examples 1B), this dyestuff gives deep orange shades.

EXAMPLE 29

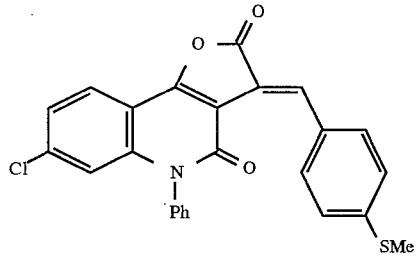

A mixture of 2.3 g of the quinoline from Example 14, 1.06 g of 4-methylthiobenzaldehyde, 0.04 g of sodium acetate, 12.5 ml of acetic anhydride and 10 ml of acetic acid is heated under reflux for 1 hour. The product is then filtered off hot with suction, washed with acetic acid and methanol and dried. Yield: 2.3 g.

When used for dyeing analogously to Dyeing Examples 1B), the above dyestuff gives brilliant deep yellow shades in plastics.

EXAMPLE 30

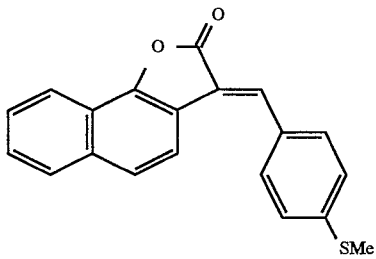

A solution of 3.6 g of the naphthofuranone from Example 4, 3.0 g of 4-methylthiobenzaldehyde and 0.08 g of sodium acetate in 12.5 ml of acetic anhydride and 10.0 ml of acetic acid is heated under reflux for 1 hour. After cooling, the precipitate is filtered off with suction and washed with methanol. Yield: 2.5 g.

When used for dyeing in accordance with Dyeing Examples 1B), the above dyestuff gives intensive, yellow colorations in plastics.

EXAMPLE 31

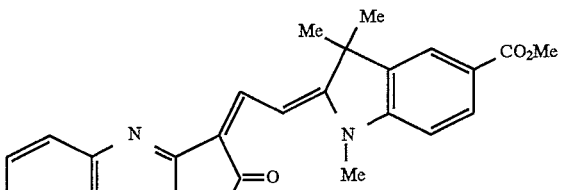

1st stage

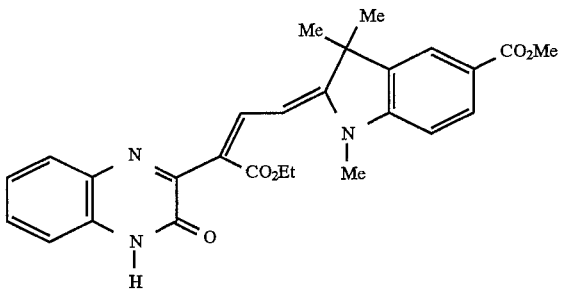

2nd stage

A mixture of 3.5 g of the quinoxaline of the formula

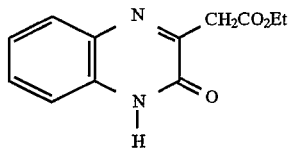

4.6 g of the aldehyde from Example 2, 12.5 ml of acetic anhydride and 10 ml of acetic acid is stirred at 110° C. for 2 hours. After cooling, the mixture is filtered and the filtrate is freed from the solvent in vacuo. The residue is dissolved in methanol under the influence of heat. The product which precipitates on cooling is filtered off with suction, washed with methanol and dried. Yield: 3.9 g 2nd stage 3.0 g of the products from the first stage are briefly heated at 240° C. in 30 ml of 1-chloronaphthalene together with 0.1 g of p-toluenesulphonic acid hydrate. After cooling, 50 ml of methanol are added and the end product which has precipitated is filtered off with suction. After washing with methanol and drying, 1.4 g of the above end product are obtained.

When used for dyeing analogously to Dyeing Examples 1B), intensive red shades are obtained with this dyestuff.

EXAMPLE 32

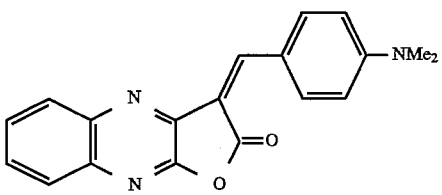

3.5 g of the quinoxaline from Example 31, 2.3 g of 4dimethylaminobenzaldehyde, 12.5 ml of acetic anhydride and 10.0 ml of acetic acid are heated at the boiling point for 30 minutes. The volatile constituents are then removed completely in vacuo, and 30 ml of 1-chloronaphthalene and 0.1 g of p-toluenesulphonic acid hydrate are added to the residue. The solution is heated at 240° C. for 45 minutes and, after cooling to 50° C., methanol is then added. The precipitate is filtered off with suction and washed with methanol. Yield: 0.5 g.

When used for dyeing in plastics in accordance with Dyeing Examples 1B), the above dyestuff gives strong orange dyeings.

EXAMPLE 33

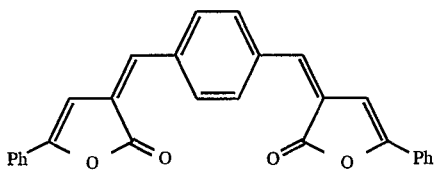

A solution of 4.5 g of benzoylpropionic acid, 1.4 g of terephthalic dialdehyde and 0.04 g of sodium acetate in 12.5 ml of acetic anhydride and 10 ml of acetic acid is heated at the boiling point for 20 minutes, while stirring. A further 10 ml of acetic acid are then added and the precipitate is filtered off hot with suction and washed thoroughly with acetic acid and methanol. Yield: 3.5 g.

Plastics are dyed intensively orange by the above dyestuff in accordance with Dyeing Examples 1B).

EXAMPLE 34

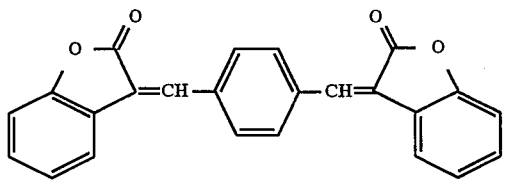

A mixture of 6.7 g of the benzofuranone from Example 1, 2.7 g of terephthalic dialdehyde, 0.08 g of sodium acetate, 12.5 ml of acetic anhydride and 10 ml of acetic acid is heated under reflux for 1 hour. After cooling, the precipitate is filtered off with suction, washed with methanol and dried. Yield: 5.8 g.

Intensive yellow shades are obtained when the above dyestuff is used for dyeing in plastics analogously to Dyeing Examples 1B).

EXAMPLE 35

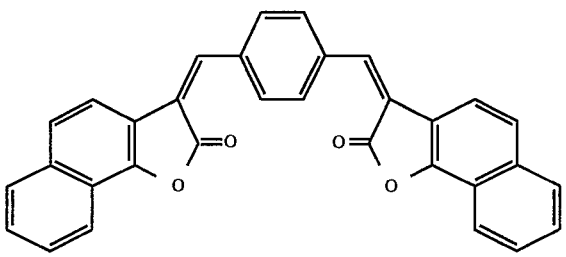

A suspension of 2.5 g of naphthofuran from Example 4, 0.73 g of terephthalic dialdehyde, 0.025 g of sodium acetate, 10 ml of acetic anhydride and 8 ml of acetic acid is heated under reflux for 1.5 hours. The precipitate which has separated out is filtered off with suction and washed with acetic acid and methanol. Yield: 2.0 g.

When used for dyeing in accordance with Dyeing Examples 1B), the above dyestuff leads to brilliant orange colour shades.

EXAMPLE 36

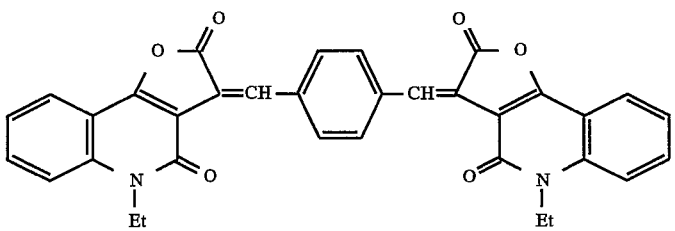

A mixture of 4.95 g of the quinolone from Example 11, 1.34 g of terephthalic dialdehyde, 12.5 ml of acetic anhydride and 10 ml of acetic acid is heated under reflux for 2 hours. The precipitate formed is filtered off with suction at 80° C., washed with glacial acetic acid and methanol and dried. Yield: 2.8 g.

When used for dyeing in accordance with Dyeing Examples 1B), yellow shades are obtained with the above dyestuff.

EXAMPLE 37

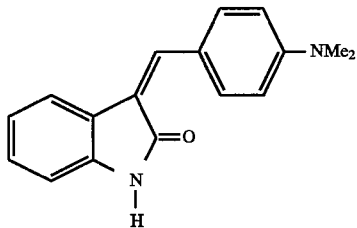

A mixture of 2.2 g of 2-indolone of the formula

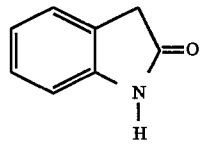

2.3 g of 4-dimethylaminobenzaldehyde, 0.3 ml of piperidine and 30 ml of toluene is heated for 2 hours, using a water separator. The mixture is then cooled to room temperature and the precipitate is filtered off with suction. It is washed with toluene and diethyl ether and dried. Yield: 3.8 g.

When used for dyeing in accordance with Dyeing Examples 1B), yellow shades are obtained with the above dyestuff.

EXAMPLE 38

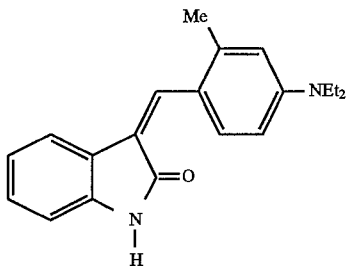

A mixture of 2.2 g of 2-indolone, 3.1 g of 4-diethylamino-2-methylbenzaldehyde, 0.3 ml of piperidine and 30 ml of toluene is heated under reflux for 3 hours, using a water separator. After 18 hours at room temperature, the precipitate is filtered off with suction, washed with toluene and diethyl ether and dried. Yield: 1.5 g.

When used for dyeing analogously to Dyeing Examples 1B), the above dyestuff gives brilliant deep yellow shades in plastics.

EXAMPLE 39

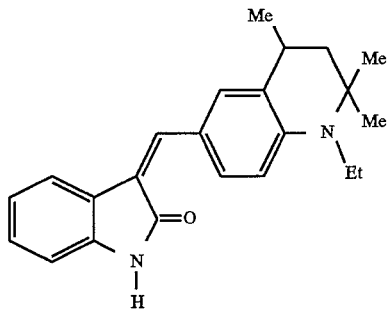

2.2 g of 2-indolone are reacted with 3.5 g of an aldehyde of the formula

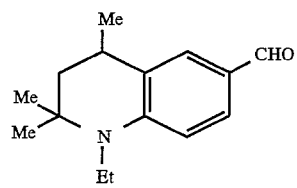

analogously to Example 1. The mixture is then concentrated in vacuo and the product is precipitated with diethyl ether. Yield: 4.1 g.

When used for dyeing in accordance with Dyeing Examples 1B), the above dyestuff gives intensive, yellow colorations in plastics.

EXAMPLE 40

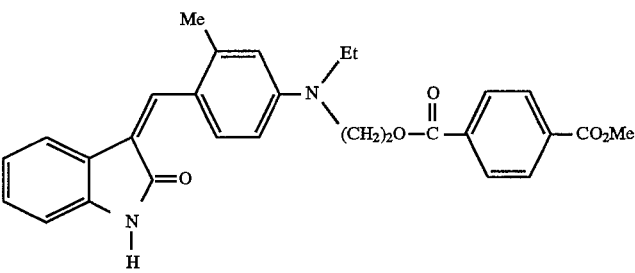

2.2 g of 2-indolone, 5.5 g of the aldehyde of the formula

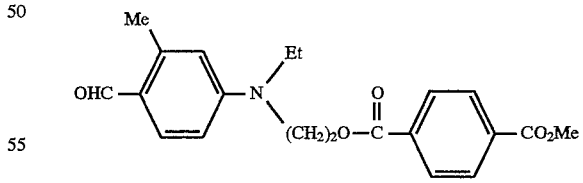

0.3 ml of piperidine and 30 ml of toluene are heated for 1hour, while removing the water of reaction from the circulation. The product is then filtered off with suction, washed with toluene and ether and dried. Recrystallization from toluene gives 3.7 g.

When used for dyeing in plastics analogously to Dyeing Examples 1B), the above dyestuff gives intensive yellow shades.

EXAMPLE 41

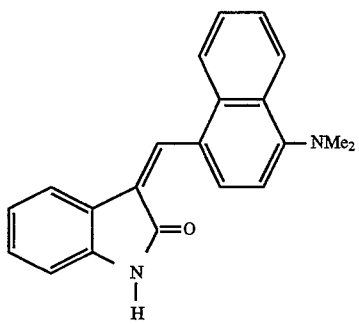

A mixture of 2.2 g of 2-indolone, 4.8 g of 4-dimethyl-aminonaphthalene-1-carbaldehyde, 0.3 ml of piperidine and 30 ml of toluene is heated for 1 hour, using a water separator. The mixture is then diluted with toluene and the precipitate is filtered off with suction. After washing with toluene and diethyl ether, 4.1 g of the dyestuff of the above formula are obtained.

When used for dyeing analogously to Dyeing Examples 1B), strong yellow shades are obtained with the above dyestuff.

EXAMPLE 42

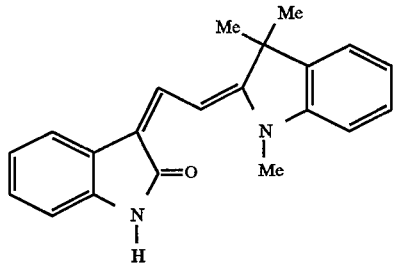

3.0 g of aldehyde of the formula

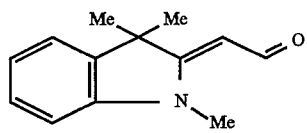

and 2.2 g of 2-indolone are reacted in 30 ml of toluene in the presence of 0.3 ml of piperidine in the customary manner. After filtration and washing with toluene and diethyl ether, 4.6 g of the above product are obtained.

Deep reddish-tinged yellow shades with good fastness properties are obtained analogously to the dyeing examples from Example 1.

EXAMPLE 43

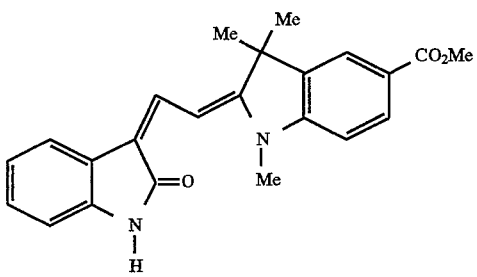

A mixture of 2.2 g of indolone, 4.6 g of the aldehyde of the formula

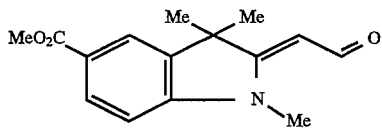

0.3 ml of piperidine and 30 ml of toluene is heated for 30 minutes, using a water separator. The precipitate formed is filtered off with suction at 100° C. and washed in the customary manner. Yield: 4.4 g.

If the above dyestuff is used for dyeing analogously to the dyeing examples from Example 1, fast, deep yellow shades are obtained.

EXAMPLE 44

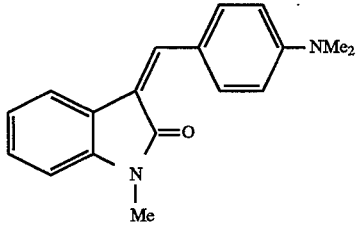

A mixture of 2.2 g of 1-methyl-2-indolone of the formula

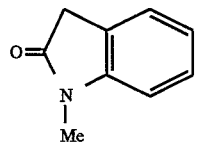

2.3 g of 4-dimethylaminobenzaldehyde, 0.3 ml of piperidine and 30 ml of toluene is heated for 4 hours, using a water separator. The solvent is then removed in vacuo and the residue is dissolved in hot methanol; on cooling, the product precipitates, and is filtered off with suction and washed with methanol. Yield: 2.3 g.

When used for dyeing analogously to the dyeing examples from Example 1, the above dyestuff gives deep yellow dyeings.

EXAMPLE 45

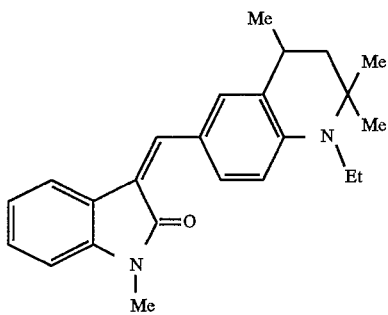

A solution of 2.4 g of 1-methyl-2-indolone, 3.8 g of the aldehyde from Example 39 and 0.3 ml of piperidine in 30 ml of toluene is heated for 6 hours, using a water separator. The solvent is then removed in vacuo and the residue is heated at the boiling point with methanol. On cooling, the product precipitates as an oil. After decanting, it is dried and then extracted with ligroin. On cooling, the dyestuff precipitates as crystals and is filtered off with suction. Yield: 0.7 g.

When used for dyeing in accordance with Dyeing Examples 1B), the dyestuff gives deep yellow shades.

EXAMPLE 46

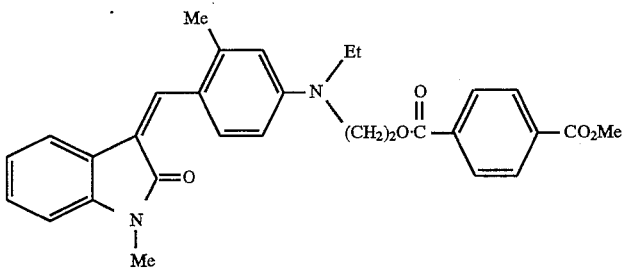

Analogously to Example 45, 2.4 g of 1-methyl-2-indolone are reacted with 5.5 g of the aldehyde from Example 40 and the product is worked up. Yield: 1.6 g.

The above dyestuff dyes plastics in intensive yellow shades in accordance with Dyeing Examples 1B).

EXAMPLE 47

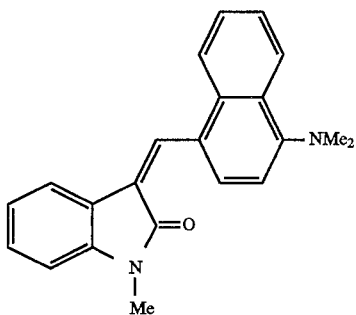

A mixture of 2.4 g of 1-methyl-2-indolone, 4.8 g of 4-dimethylamino-naphthalene-1-carbaldehyde, 0.3 ml of piperidine and 30 ml of toluene is heated at the boiling point for 2.5 hours, using a water separator. After cooling, the precipitate is filtered off with suction and washed with toluene and methanol. Yield: 2.9 g.

When used for dyeing in accordance with Dyeing Examples 1B), strong yellow shades are obtained with the above dyestuff.

EXAMPLE 48

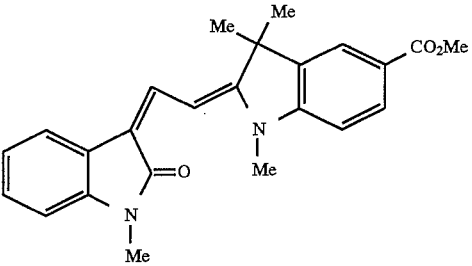

A suspension of 2.4 g of 1-methyl-2-indolone, 4.2 g of the aldehyde from Example 43, 0.3 ml of piperidine and 30 ml of toluene is heated for 2 hours, using a water separator. The mixture is then filtered hot and the residue is rinsed with 10 ml of boiling toluene. On cooling, the dyestuff precipitates out of the filtrate. After filtration with suction and washing with diethyl ether, 3.9 g of the above product are obtained.

When used for dyeing in plastics in accordance with Dyeing Examples 1B), this dyestuff gives deep reddish-tinged yellow shades.

EXAMPLE 49

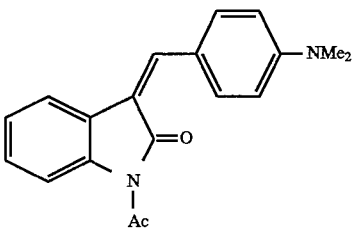

A solution of 2.0 g of 2-indolone, 2.3 g of 4-dimethylaminobenzaldehyde, 12.5 ml of acetic anhydride and 10.0 ml of acetic acid is heated under reflux for 4 hours and then freed from the solvent under reduced pressure. The residue is heated under reflux in 50 ml of methanol for 15 minutes. The precipitate formed is filtered off with suction at 60° C. and washed with methanol. Yield: 3.2 g.

When used for dyeing analogously to the dyeing examples from Example 1, intensive, yellow dyeings are obtained.

EXAMPLE 50

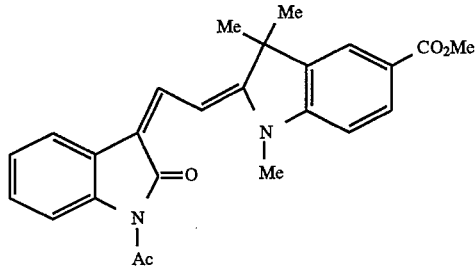

2.2 g of 2-indolone are reacted with the aldehyde from Example 43 analogously to Example 13. After 20 minutes, the mixture is cooled and the product is filtered off with suction and washed with acetic anhydride and methanol. Yield: 2.9 g.

In plastics, the dyestuff gives intensive yellow dyeings analogously to the dyeing examples from Example 1.

I claim:

1. A process for bulk dyeing of plastics wherein a dyestuff of the formula

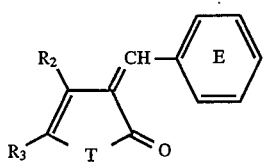

(III)

wherein
 T represents O or N—$R_0$
  wherein
   $R_0$ denotes H, alkyl, aryl or acyl,
 $R_2$ and $R_3$ together form a radical of the formula

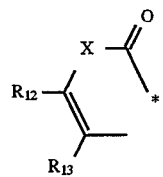

(F 1)

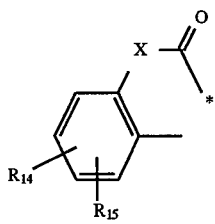

(F 2)

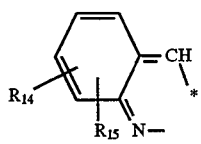

(F 3)

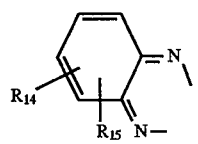

(F 4)

wherein the bond labelled with * identifies the $R_2$ linkage, and wherein

X represents O or N—$R_{16}$, wherein $R_{16}$ denotes H, $C_1$–$C_6$-alkyl or phenyl, $R_{12}$ represents H, phenyl or $C_1$–$C_4$-alkyl, $R_{13}$ represents H, phenyl, $C_1$–$C_4$-alkyl, $C_1$–$C_4$-alkoxycarbonyl, aminocarbonyl, mono- or dialkylaminocarbonyl, arylaminocarbonyl, $C_1$–$C_4$-alkylcarbonyl, benzyl or Cl, $R_{14}$ and $R_{15}$ independently of one another represent H, Cl, $C_1$–$C_4$-alkyl, $C_1$–$C_4$-alkoxy or $C_1$–$C_4$-alkoxycarbonyl substituents, or together form the radical of a benzo ring unsubstituted or substituted by these substituents, or $R_2$ and $R_3$ together form the radical of an unsubstituted or substituted benzo or naphtho ring, and the ring E carries a $C_1$–$C_4$-dialkylamino radical, which is substituted by Cl, phenyl, CN, OH, alkoxy, dialkylamino, alkoxycarbonyl wherein said E ring is optionally further substituted by (i) up to 2 $C_1$–$C_6$alkyl groups or halogen atoms, which are independent of one another, (ii) an acylamino-, acyloxy- or hydroxy-group, (iii) or a combination of (i) and (ii), or a dyestuff of the formula

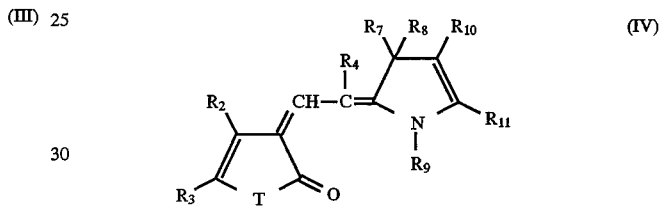

(IV)

wherein $R_2$, $R_3$ and T have the above-mentioned meaning, $R_4$ represents H or alkyl, $R_7$ and $R_8$ independently of one another represent $C_1$–$C_4$-alkyl or together form the radical of an unsubstituted or substituted carbocyclic 5- or 6-membered ring, $R_9$ denotes a $C_1$–$C_4$-alkyl group which is unsubstituted or substituted by phenyl, Cl, OH, CN, alkoxycarbonyl, alkoxy, dialkylamino or alkoxy and $R_{10}$ and $R_{11}$ together form the radical of an unsubstituted or substituted benzene or naphthalene ring, is incorporated into a molten plastics composition or wherein the dyestuff is already added to starting components for the preparation of the plastic before the polymerization.

2. The process according to claim 1, wherein in formula (III) the substituted $C_1$–$C_4$-dialkylamino radical of the E-ring is attached in the para-position.

3. The process according to claim 1, wherein $R_2$ and $R_3$ together form the radical of an unsubstituted naphthalene ring which is 1,2-, 2,1- or 2,3-linked, or form a benzyl ring which is unsubstituted or substituted by 0 to 2 $C_1$–$C_6$-alkyl groups of chlorine atoms which are independent of one another, or by 0 to 1 $C_1$–$C_4$-alkoxy or $C_1$–$C_4$-alkoxycarbonyl radicals.

4. The process according to claim 1, wherein T denotes O.

5. The process according to claim 1, whereto the plastic is a thermoplastic.

6. The process according to claim 1, wherein the plastic is vinyl polymer, a polyester or polyamide.

7. A plastic dyed by a process according to claim 1.

* * * * *

UNITED STATES PATENT AND TRADEMARK OFFICE
CERTIFICATE OF CORRECTION

PATENT NO. : 5,626,633
DATED : May 6, 1997
INVENTOR(S) : Roschger, Peter

It is certified that error appears in the above-identified patent and that said Letters Patent is hereby corrected as shown below:

Col. 38, line 61    Delete " whereto " and substitute
                    -- wherein --

Signed and Sealed this

Twenty-fifth Day of November, 1997

Attest:

BRUCE LEHMAN

Attesting Officer        Commissioner of Patents and Trademarks